Feb. 8, 1966 T. W. BANNON 3,233,751
APPARATUS FOR TRANSFERRING A WORKPIECE BETWEEN STATIONS
Filed Oct. 16, 1963 7 Sheets-Sheet 1
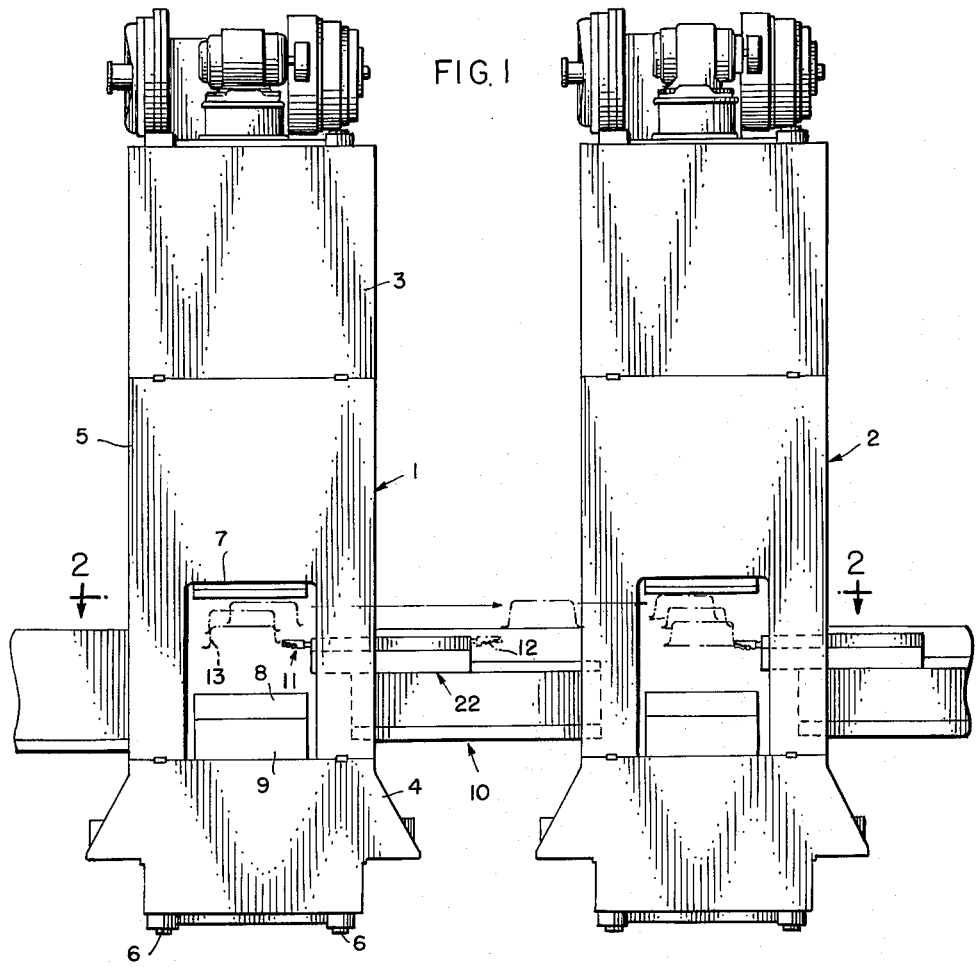
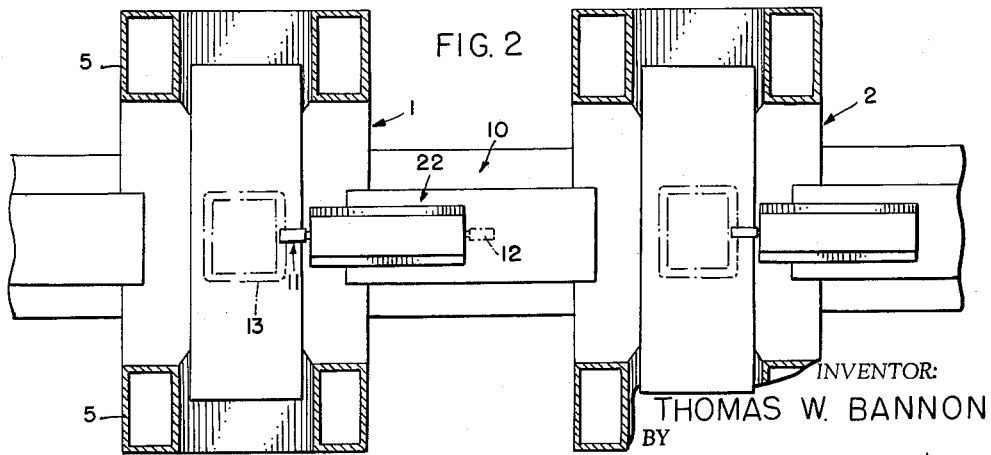
INVENTOR:
THOMAS W. BANNON
BY
Marzall, Johnston, Cook & Root
ATT'YS Feb. 8, 1966 T. W. BANNON 3,233,751
APPARATUS FOR TRANSFERRING A WORKPIECE BETWEEN STATIONS
Filed Oct. 16, 1963 7 Sheets-Sheet 2
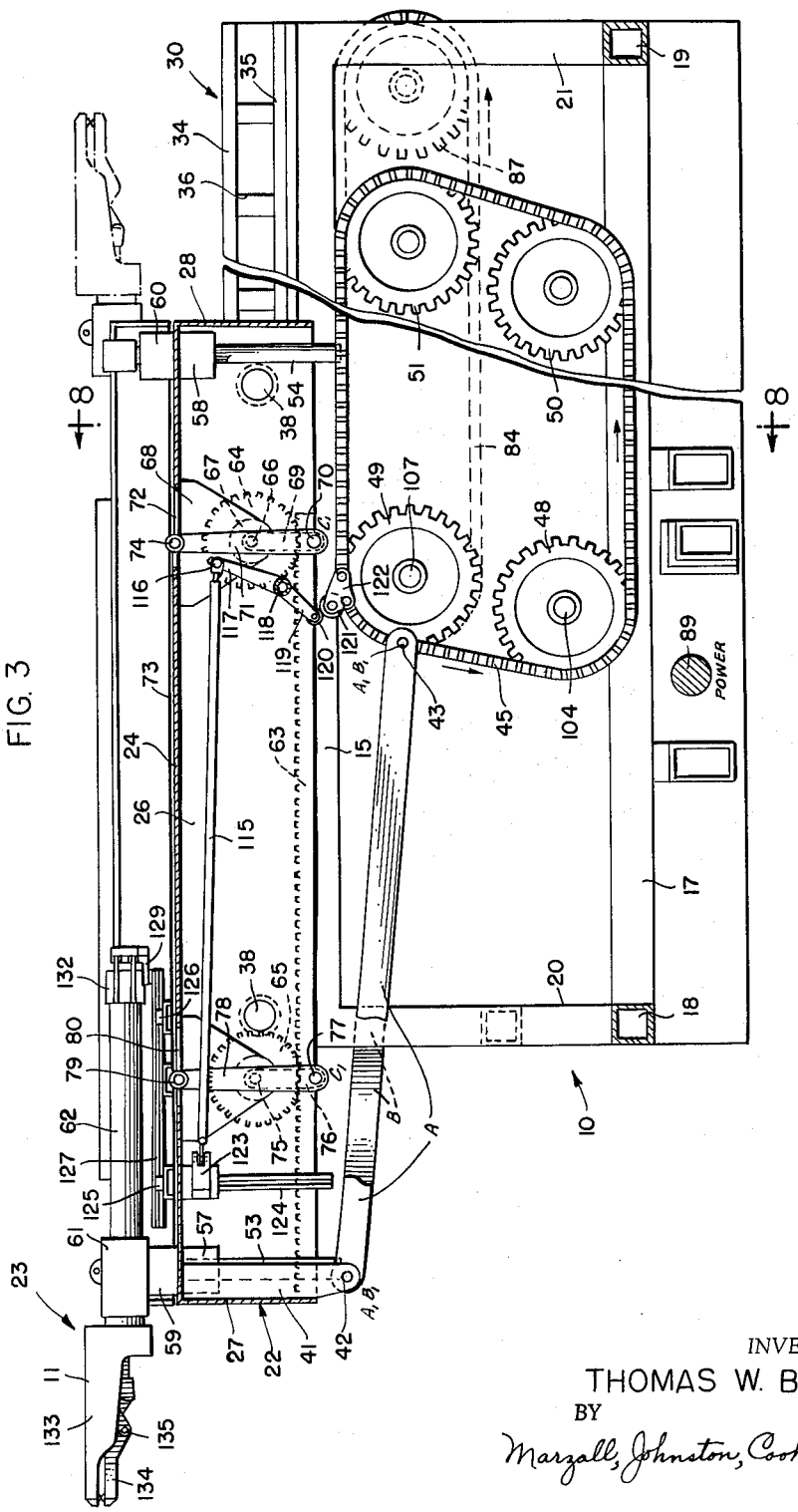
INVENTOR:
THOMAS W. BANNON
BY
Marzall, Johnston, Cook & Root
ATT'YS Feb. 8, 1966  T. W. BANNON  3,233,751
APPARATUS FOR TRANSFERRING A WORKPIECE BETWEEN STATIONS
Filed Oct. 16, 1963  7 Sheets-Sheet 3

INVENTOR:
THOMAS W. BANNON
BY
Marzall, Johnston, Cook & Root
ATT'YS

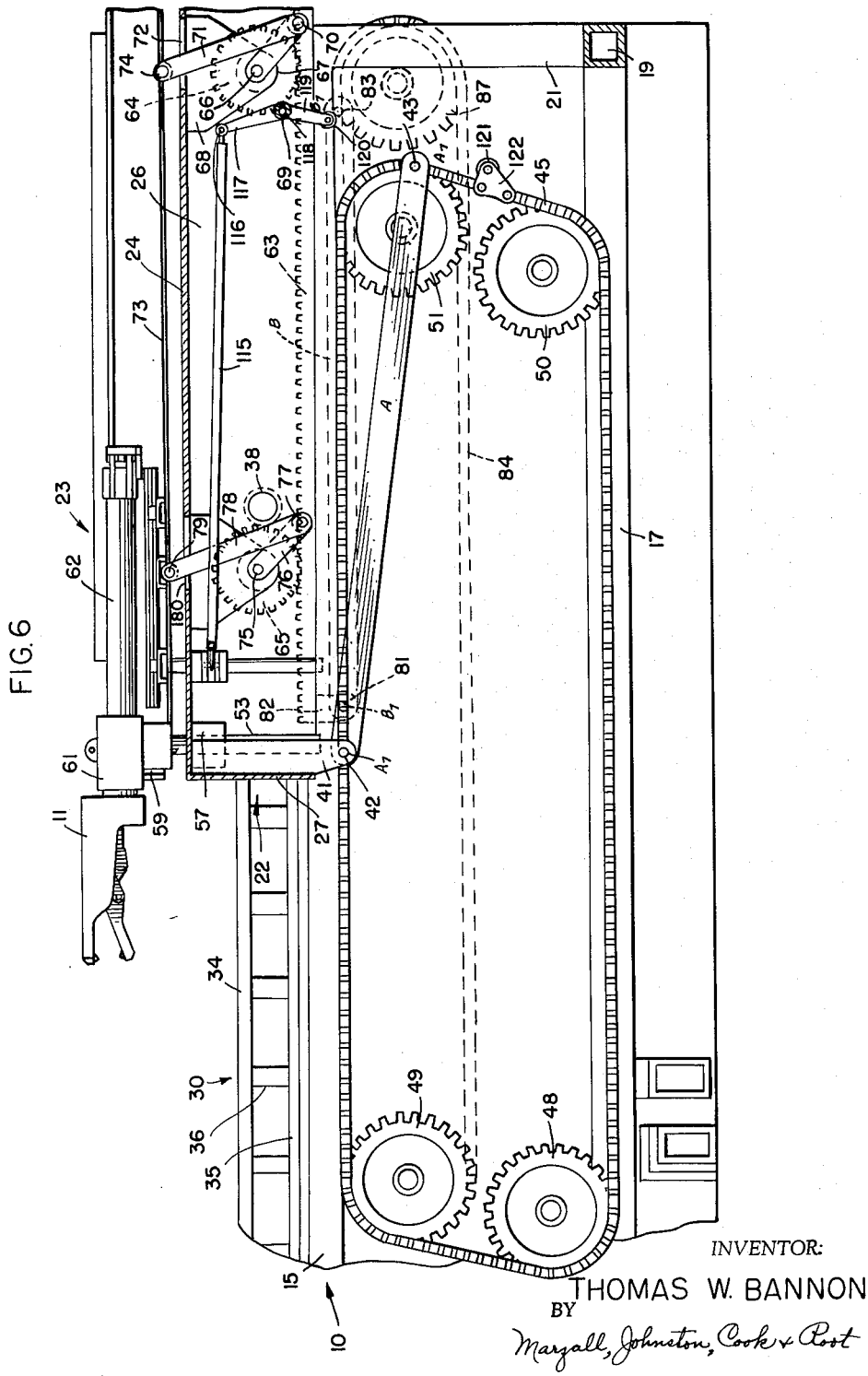

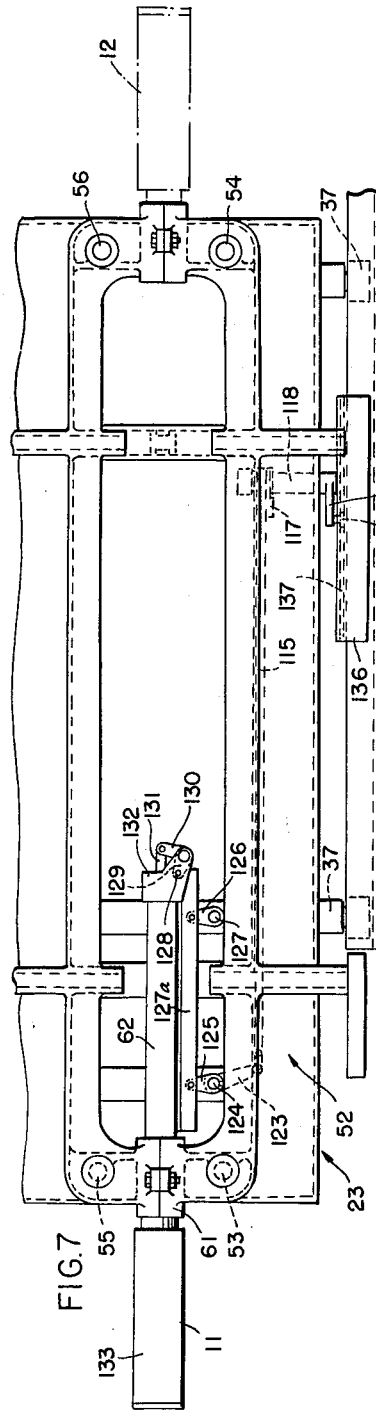

Feb. 8, 1966    T. W. BANNON    3,233,751
APPARATUS FOR TRANSFERRING A WORKPIECE BETWEEN STATIONS
Filed Oct. 16, 1963    7 Sheets-Sheet 7
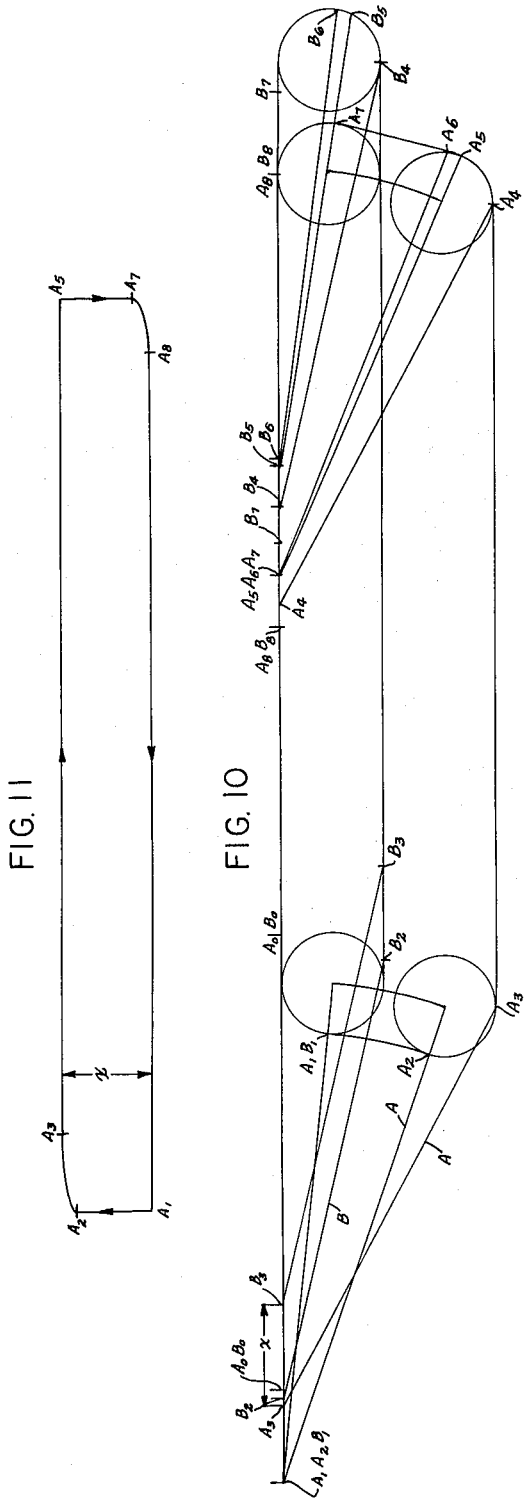
INVENTOR:
THOMAS W. BANNON
BY
Marzall, Johnston, Cook & Root
ATT'YS

United States Patent Office 3,233,751
Patented Feb. 8, 1966

3,233,751
APPARATUS FOR TRANSFERRING A
WORKPIECE BETWEEN STATIONS
Thomas W. Bannon, La Grange Park, Ill., assignor to U.S. Industries, Inc., New York, N.Y., a corporation of Delaware
Filed Oct. 16, 1963, Ser. No. 316,641
9 Claims. (Cl. 214—1)

This invention relates in general to apparatus for transferring a workpiece from one station to another where work is to be performed thereon. More specifically, the invention is directed to an apparatus useful between adjacent metal working presses where two or more such presses are in a line and where a workpiece has an operation performed thereon in one press and is then transferred to another station or to the next press where a further operation is to be performed thereon.

Devices have heretofore been designed for the purpose of removing a workpiece or stamping from one press and delivering it to another press or to an intermediate station between the presses. Particular problems arise, however, where the workpiece is operated upon in such a way that it is deformed in a die from which it must be removed by raising it out of the die before it is transferred to another station or press. An example of such a problem exists where a flat sheet of metal is stamped in the form of a pan or container where the male die is on the upper slide and the female die is on the press bed. After completion of the stamping operation the upper die moves upwardly, but in order to remove the stamping from the lower die it must be elevated substantially vertically until the upper surface of the die is cleared, at which time the workpiece may then be moved out of the press in a substantially horizontal direction either to an intermediate station or to a second press where a further operation is to be performed thereon. The problem will also exist where the male die is on the press bed but extends upwardly, thus requiring elevation of the workpiece to a position above the die.

The present invention, therefore, is directed primarily to a transfer apparatus which will accomplish the result of lifting the workpiece out of the lower die and then transferring it to a second station which may be either a second press or a position intermediate the two presses.

Devices of this general nature heretofore known are designed primarily to reciprocate in a single plane and have not been concerned with multidirectional movements necessary to accomplish the results of the present invention. It is, therefore, a principal object of the invention to provide an apparatus for transferring a workpiece from a first station to a second station wherein it is necessary to move the workpiece in more than one plane.

Another object of the invention is to provide a transfer appartus for a work piece which is operable to move the workpiece first in one direction and then another in order to transfer it from one station to another.

A further and more specific object of the invention is to provide an apparatus which will transport a workpiece in a multidirectional path from a first station to a second station wherein the apparatus for holding or picking up the workpiece is moved first in one direction for a predetermined distance and then in another direction toward the second station and then release the workpiece, leaving it at the second station.

Still another and specific object of the invention is to provide actuating mechanisms operable in synchronized and timed relation with each other to move a transport device in a multidirectional path so that when the transport device is holding the workpiece it may transfer the workpiece in one direction out of a die and then another direction to a second position, where it will be deposited for further work to be performed thereon.

A still further object of the invention is to provide a reciprocating carriage upon which is mounted a transport device movable with and with respect to the carriage and capable of holding a workpiece to be transferred from one station to another together with means for moving the carriage in one direction and other means synchronized therewith for moving the transport device in another direction, whereby a workpiece being held by the transport device may first be moved in one direction, such as in a vertical direction, out of a die and thereafter in a second direction toward a second station so that further work may be performed thereon.

Other objects and advantages of the invention will become apparent upon reading the following description taken in conjunction with the accompanying drawings, in which:

FIG. 1 is an elevational view showing two metal working presses and the transfer apparatus of the present invention applied thereto;

FIG. 2 is a horizontal sectional view taken substantially along the plane of line 2—2 of FIG. 1 showing the transfer apparatus of the present invention in plan;

FIG. 3 is a longitudinal vertical sectional view of the transfer apparatus of the present invention showing the carriage in the full forward position at the first station and the transport means for the workpiece in its lowermost position and taken substantially along the plane of line 3—3 in FIG. 8;

FIG. 6 is a fragmentary side elevational view of the transfer apparatus showing the carriage and transport device in its rearmost position and with the transport device having moved downwardly with respect to the carriage through a part of its downward movement and having theretofore been actuated to release the workpiece at the second station;

FIG. 7 is a plan view of the carriage and transport device of the transfer apparatus;

FIG. 8 is a vertical sectional view taken substantially along the plane of line 8—8 of FIG. 3;

FIG. 9 is a fragmentary elevational view showing the means for actuating the transport device for releasing the workpiece;

FIG. 10 is a diagrammatic illustration of the actuating mechanisms for the carriage and transport device showing the sequence of positions of the operating links which move the carriage and transport device from the first position thereof to the first station through their position at the second station and returning to the first station to complete the cycle;

FIG. 11 is a diagrammatic illustration of the path of movement of the transport device and the workpiece held thereby throughout a complete cycle of movement thereof from the first to the second station and back to the first station, and FIG. 12 is a diagrammatic illustration of the movement of the links which raise and lower the transport device with respect to the reciprocating carriage.

Figure 4:
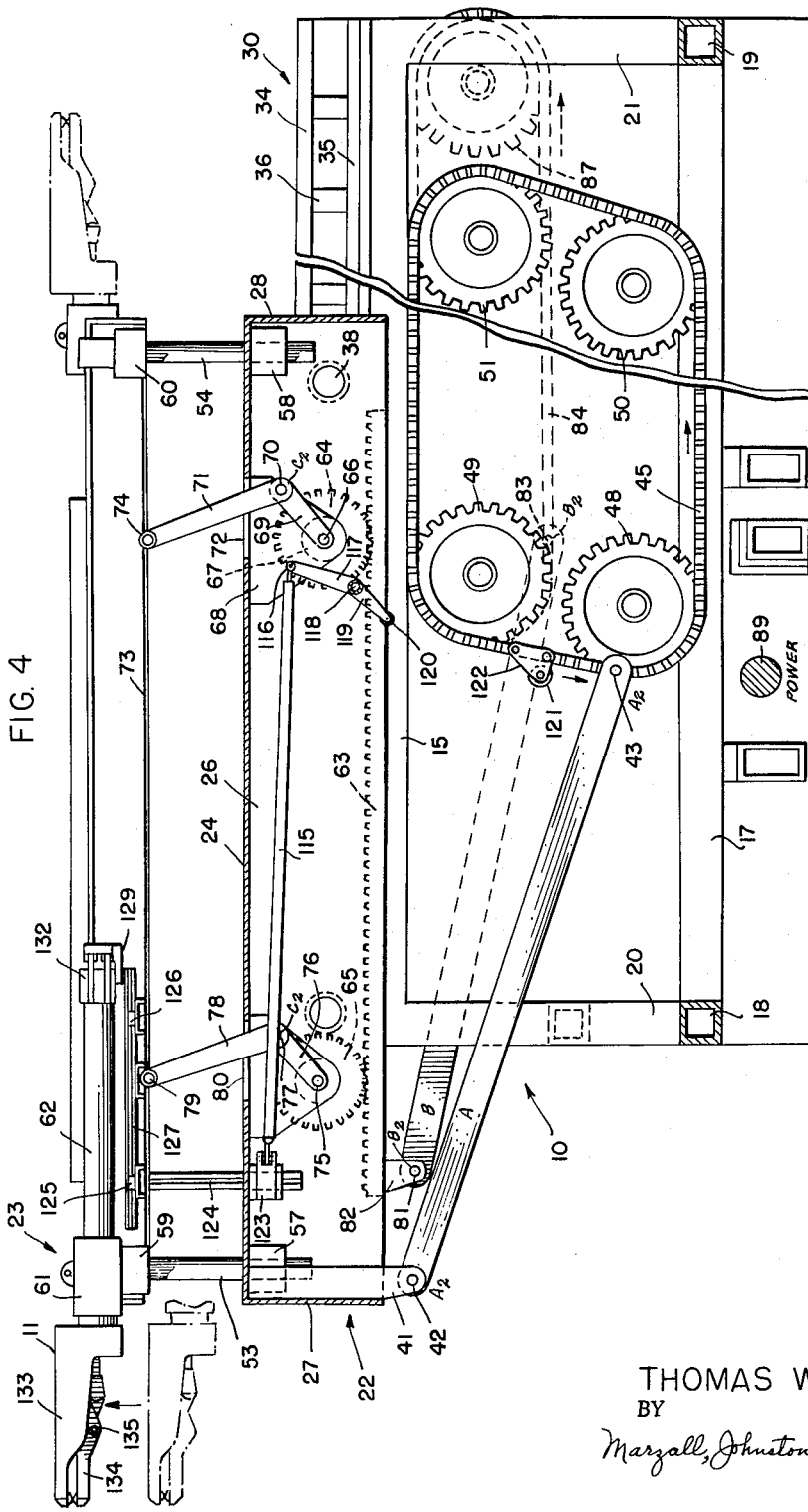
FIG. 4 is a view similar to FIG. 3 showing the carriage still in its first position but illustrating the transport device in a second position where it has been elevated through a portion of its vertical movement.

Briefly described, the transfer apparatus of the present invention embodies a combination of elements which cooperate in timed relation to move a workpiece in a multidirectional path, which path has a component in one direction during a portion thereof, a second component in another direction during another portion thereof, and a combination of the two components for still another portion thereof. The specific planes in which these various directional components are located may vary. For purposes of illustration, however, and without intending any limitation thereof, the particular transfer apparatus shown herein utilizes for the multidirectional path of movement a vertical component, a horizontal component, and a combination of the vertical and horizontal components.

A carriage is provided which reciprocates in a horizontal direction back and forth between the first and second stations. A transport device is provided so that it may move both with and with respect to the carriage. The transport device as shown herein is adapted to move in a vertical direction.

The transport device is designed to pick up and hold a workpiece after it has had an operation performed thereon. As stated hereinabove, the workpiece may be one which has been stamped by an upper male die into the cavity of the lower female die. The transport means will then contact the workpiece to pick it up and move it in a vertical direction out of the female die. Before the transport device has reached its fully raised position, the carriage will begin movement in a horizontal path so that for a short distance the path of movement will be a combination of vertical and horizontal components. This, however, is solely for the purpose of efficiency in removing the workpiece from the press and beginning its movement toward the second station as quickly as possible. It will be evident to those skilled in the art that the transport device could pick up the workpiece and move it upwardly in a vertical direction to the full extent of the vertical movement before beginning the horizontal movement of the carriage. This, however, would be more time-consuming and would take longer for the transport device to complete its cycle.

When the transport device has reached its fully elevated position, it will move with the carriage to the second station where it will release the workpiece for whatever further work is to be performed thereon. At the second station the transport device will move downwardly with respect to the carriage and during a dwell in the carriage movement. Again, to save time, before the transport device reaches its fully lowered position, the carriage will begin its return movement to the first station so that for a short distance the transport device will move in a path which has both vertical and horizontal components.

Referring now more particularly to the drawings, and especially to FIGS. 1 and 2, there is illustrated two metal forming presses identified generally by the numerals 1 and 2, respectively. The invention herein is particularly adapted for use with metal working presses, but of course is by no means intended to be limited to such use. Also, any press adapted to perform an operation on a workpiece is suitable for the present invention to be applied thereto. The presses may be of the single, double, or triple action type, or a combination thereof. For purposes of illustration, the presses 1 and 2 shown herein are single action presses, each of which includes a crown portion 3, a bed 4, and the intermediate section 5, all of which may be held together by means of tie rods 6.

An upper reciprocating slide 7 may have a suitable die mounted thereon to cooperate with a lower die 8 mounted on a bolster 59 on the press bed. The transfer apparatus is generally indicated by the numeral 10 and has at least at one end thereof a transport device generally indicated by the numeral 11. In certain instances it may also be desirable to have a transport device such as that indicated at 12 at the opposite end of the transfer apparatus.

The apparatus 10 is adapted to reciprocate in a substantially horizontal plane from a first station to a second station and back to the first station in order to transfer a workpiece, such as that indicated by the numeral 13 as shown in dotted lines, from the first to the second station. The transport device 11 is mounted on the transfer apparatus to move horizontally with it and is also adapted to move vertically with respect to the apparatus. As stated before, this is for the purpose of lifting the workpiece in a vertical direction out of a die cavity so that it may thereafter be moved in a horizontal direction to a second station. The details of the transfer apparatus comprising the present invention are illustrated more clearly in FIGS. 3 to 8, inclusive, to which reference will now be made.

The transfer apparatus 10 consists generally of a framework of any suitable construction but which is shown herein as including the upper elongated horizontally extending and spaced-apart bars 14 and 15, the lower horizontally spaced-apart bars 16 and 17, suitable cross members 18 and 19, and the vertical members 20 and 21.

The frame is stationary and has mounted thereon a carriage generally indicated by the numeral 22. The carriage is reciprocable in a horizontal path and guided in such movement by tracks which will be described in more detail hereinafter. The transport device 11 and the operating mechanism therefor is generally indicated by the numeral 23 and is mounted on the carriage in such a way as to be movable therewith and with respect thereto.

The carriage consists of an upper flat plate 24 which forms the top thereof. The top 24 is then provided with downwardly extending side plate members 25 and 26 which extend longitudinally of the carriage. Downwadly extending end members 27 and 28 form the closed ends of the carriage.

At each side of the frame and extending longitudinally thereof are tracks 29 and 30 which act to guide the carriage in its reciprocating movement (see FIG. 8.) The tracks 29 consists of upper and lower guide plates 31 and 32 secured together in spaced-apart relation by spacer members 33. The track 30 at the opposite side of the frame is similarly constructed and includes the upper and lower guide plate members 34 and 35 held together in spaced-apart relation by means of a plurality of spacer members 36. The carriage at one side thereof is provided with a plurality of rollers 37 adapted to roll on the track 29 while at the opposite side of the carriage rollers 38 are guide by the track 30.

Rollers 39 and 40 are mounted to rotate about a vertical axis at opposite sides of the carriage which constitute additional means for maintaining and guiding the carriage in its reciprocating movement.

The forward end of the carriage 22 adjacent the downwardly extending apron 27 is provided with a bracket 41 consisting of a pair of spaced-apart side members. The bottom end of the bracket 41 is provided with a pivot pin 42 between the sides thereof, to which the forward end of a link A is connected. The opposite or rear end of the link A is connected by means of a pivot pin 43 to a pair of spaced-apart chains 44 and 45 (see FIG. 8). The chain 44 passes around four sprockets. If the lefthand end of the apparatus as viewed in FIGS. 3, 4, 5, and 6 may be considered the forward end thereof, then FIG. 8 shows the two forward sprockets 46 and 47. Likewise, the chain 45 passes around four sprockets, the forward ones of which are indicated at 48 and 49. These two sprockets may be seen in FIG. 8 as well as in FIGS. 3 to 6, inclusive.

The chain 45 extends around the rear sprockets 50 and 51, as shown in FIGS. 3 to 6, inclusive. There are also two sprockets at the rear of the apparatus around which chain 44 passes, but these sprockets are not shown in any of the drawings. They are, however, in direct alignment with sprockets 50 and 51. Thus, the four sprockets for the chain 44 are in direct alignment with the four sprockets around which chain 45 passes.

It will thus be evident at this point that movement of the chains 44 and 45 in a counterclockwise direction, as viewed in FIGS. 3 to 6, inclusive, will carry with them the pin 43 to which is connected the link A for reciprocating the carriage 22. As will be brought out more clearly hereinafter, the carriage dwells in its forward position, as shown in FIG. 3, and is then moved rearwardly where it again dwells in the rearmost position thereof. Continued movement of the chains 44 and 45 then returns the carriage to its forwardmost position, as shown in FIG. 3.

The transport device, generally shown at 23, is mounted upon the carriage 22 so that it may move therewith as well as with respect thereto. In order that the workpiece may be elevated vertically, it is caused to do so while the carriage remains stationary. There is then a continued vertical movement of the transport device for a relatively short distance after the carriage begins its rearward movement from the position thereof in FIG. 4 to the positions shown in FIGS. 5 and 6.

The transport device 23 has associated therewith a mounting arrangement consisting generally of a framework 52. This framework, as shown in FIG. 7, is generally of a rectangular configuration and has a downwardly extending guide rod at each corner. These rods are indicated by the numerals 53, 54, 55, and 56. The rods 53 and 54 may be seen in FIGS. 3 to 6, inclusive.

Four bearing blocks are mounted at the underside of the top plate 24 of the carriage, each of which is adapted to receive one of the guide rods 53–56 for sliding movement therein. Two of such guide blocks may be seen at 57 and 58 in FIGS. 3 to 5, inclusive. Similar blocks are secured to the upper end of each of the guide rods, two of which blocks may be seen in FIGS. 3 to 5 and are indicated by the numerals 59 and 60. These blocks may also act as stop members to limit the downward movement of the guide rods.

The lefthand or forward end of the frame 52 is provided with a tubular bearing member 61 through which an elongated tubular member 62 extends and is to be secured in any desired adjusted position. As will be pointed out hereinafter, the tubular member 62 houses the actuating mechanism for the transport device which actually picks up the workpiece and transports it from the first to the second station.

The entire frame 52 and all of the parts mounted thereon are adapted to be raised and lowered with respect to the carriage 22. The mechanism by which this raising and lowering is achieved will now be described.

An elongated rack 63 is mounted within the main frame 10, which rack extends longitudinally of the carriage and is slidable with respect thereto. A pair of pinions 64 and 65 are mounted within the carriage and are in mesh with the rack 63. Pinion 64 is mounted on a shaft 66 which is journaled in a bearing member 67 formed integral with a bracket 68 depending from the underside of the top 24 of the carriage (see FIGS. 3 to 5 and 8). The opposite end of the shaft 66 (the lefthand end as viewed in FIG. 8) has mounted thereon and secured thereto a link 69. The outer end of the link 69 is pivotally secured as at 70 to another link 71 which extends upwardly therefrom through a slot 72 in the top of the carriage. The upper end of the link 71 is pivotally secured to the bottom 73 of the frame 52 by means of the pivot pin 74.

Figure 5:
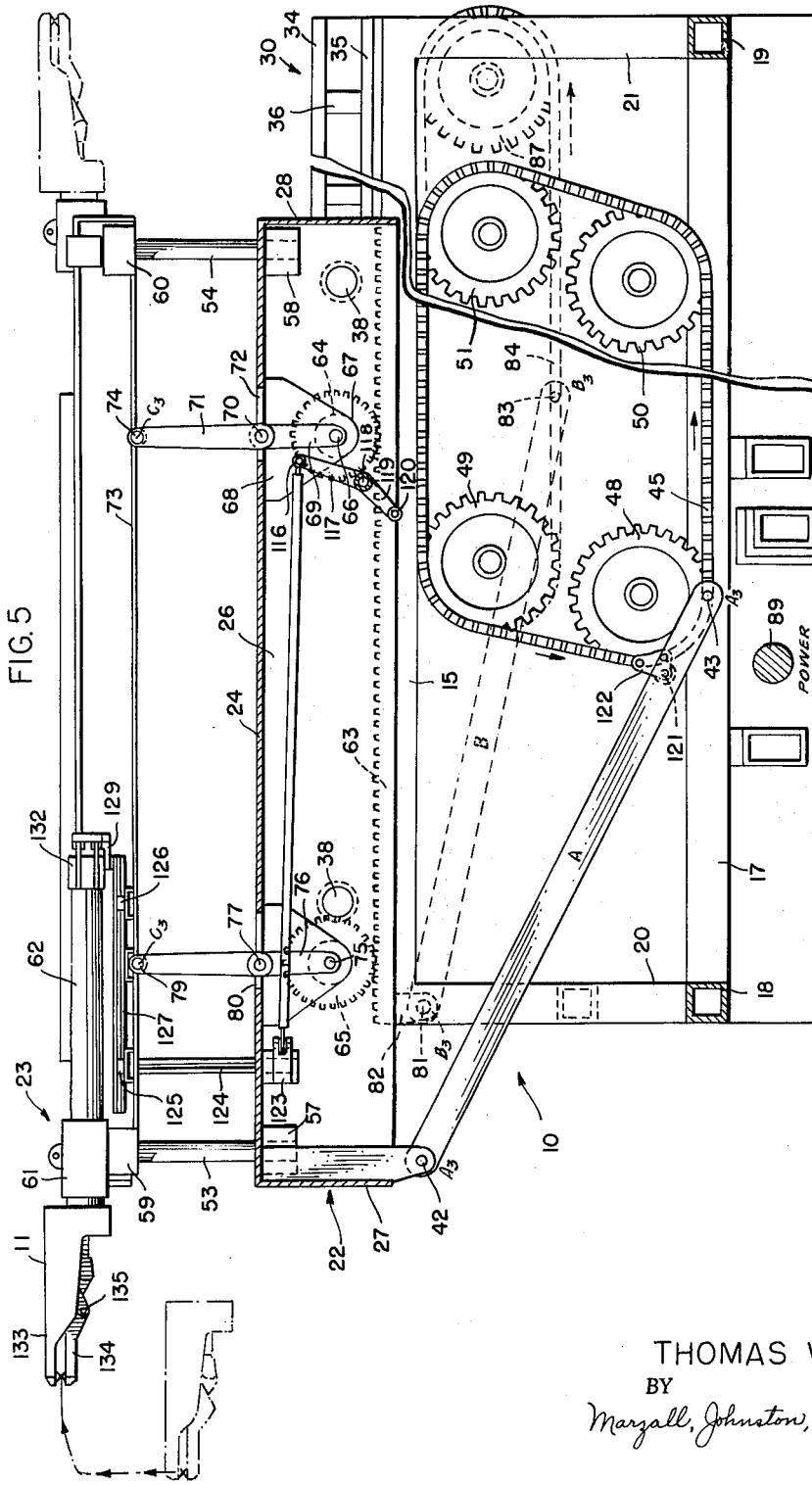
FIG. 5 is a view similar to FIGS. 3 and 4 but showing the carriage after it has started its movement toward the second station in a horizontal path and showing the transport device in its fully elevated position and moving with the carriage.

As the rack 63 is caused to move toward the right, as viewed in FIGS. 3 to 6, inclusive, the pinion 64 will rotate in a conunterclockwise direction and the two link members 69 and 71 will move through the successive positions thereof, as illustrated in FIGS. 4 and 5, wherein the pivot 70 will have a circular movement in a counterclockwise direction.

The other pinion 65 at the forward end of the carriage is similarly mounted on a shaft 75 which has connected thereto at one end a link 76. The outer end of link 76 is provided with a pivot pin 77 to which is connected the link 78. This latter link extends upwardly and is pivotally mounted to the frame 52 by means of the pivot pin 79. The link 78 also extends upwardly through a slot 80 in the top plate 24 of the carriage so as to permit upward movement thereof.

Thus far it will be apparent that rearward movement of the rack 63 or movement thereof toward the right as viewed in FIGS. 3 to 6, inclusive, will cause the pinions 64 and 65 to rotate in a counterclockwise direction simultaneously. This movement will cause a counterclockwise movement of the two links 69 and 76 resulting in an upward movement of the links 71 and 78, thereby to elevate the frame 52 and the transport device mounted thereon. This elevation will occur throughout a predetermined distance depending upon the length of the links 71 and 78. Obviously, when the links 69 and 71 on the one hand, and links 76 and 78 on the other, reach their fully extended position, as shown in FIG. 5, the frame 52 and the transport device mounted thereon will have reached the uppermost position thereof.

The rack 63 is caused to reciprocate by mechanism which will now be described, particular reference being had again to FIGS. 3 to 6 and 8.

The link B is pivotally secured at its forward end by means of the pivot pin 81 to a downwardly extending bracket 82 secured to the forward end of rack 63. The opposite or rearmost end of the link B is secured by means of the pin 83 to the spaced-apart chains 84 and 85. Chain 84 passes around two sprockets, one of which is indicated by the number 86 in FIG. 8, but which cannot be seen in FIGS. 3 to 6 inclusive, because it is directly behind and in line with the sprocket 49 around which the chain 45 passes. The other, or rearmost sprocket 87 is shown in dotted lines in FIGS. 3 to 6.

The other chain 85 likewise passes around two sprockets, the forward one of which is indicated at 88 and may be seen in FIG. 8. The other sprocket around which the chain 85 passes is immediately behind and in alignment with the sprocket 87.

The two chains 44 and 45 on the one hand are caused to move simultaneously with and at the same rate of speed as the two chains 84 and 85. Each of the chains 84 and 85 passes around only two sprockets, whereas each of the chains 44 and 45 will pass around four sprockets. Also, the number of links in chains 44 and 45 is the same as the number of links in chains 84 and 85, and the number of teeth in the drive sprockets for chains 44 and 45 will be the same as the number of teeth in the drive sprockets for chains 84 and 85. This is necessary for proper timing and to provide a dwell in the movement of the carriage 22 while all of the drive chains move continuously. Since it is necessary that a movement of rack 63 and consequent elevation of the transport device take place during the dwell of the carriage, the chains 84 and 85 will move the link B through its connection 83 through a different path of movement than that of link A and its connection 43.

Reference will be made more specifically hereinafter to FIGS. 10, 11 and 12 which will illustrate schematically the relative movement of the carriage and transport device. For present purposes it may be stated that FIG. 3 shows the two links A and B in identical positions with the carriage in its forwardmost position and the transport device in its lowermost position. As the various chains move counterclockwise, the pivot connection 43 of link A will move from its FIG. 3 position to its FIG. 4 position during which time no movement of the carriage takes place. During this same period of time, however, the above connection 83 of the link B will have moved from its position in FIG. 3 to its position of FIG. 4, thereby moving the rack 63 toward the right and elevating the transport device through a part of its forward movement.

Continuous movement of the links A and B from their positions shown in FIG. 4 to their positions shown in FIG. 5 will cause a relatively small amount of movement of the carriage and will simultaneously cause a completion of the upward movement of the transport device. Continued movement of the drive chains will move both the carriage and transport device simultaneously toward the rearmost position thereof shown in FIG. 6. At this point there will be a further dwell of the carriage while the transport device is lowered through a part of its downward movement. The remainder of the downward movement of the transport device will occur simultaneously with the beginning of the carriage movement back toward its forwardmost position. Thereafter, all parts continue in a straight line back to the position thereof shown in FIG. 3.

It will be evident that any suitable power means may be provided to drive the drive chains at the desired rate of speed. It should be mentioned here that the carriage and transport device mounted thereon must move in timed relation with the operation of the press from which the workpiece is being removed. In other words, as the press at the first station completes its stamping operation and the upper slide moves upwardly, the transport device must pick up the workpiece and move it upwardly to clear the die and then transfer it to the second station. The transport device must then deposit the workpiece in the desired location and return to the first station in time to pick up the next workpiece which has had an operation performed thereon by the press. Thus, for each cycle of the press the entire transfer apparatus must also complete one cycle and in this way they must be synchronized and be moved together in timed relation.

The particular means shown herein for purposes of illustration has the drive means for driving the chains and actuating the various parts of the apparatus controlled thereby, and may be more clearly understood by reference particularly to FIG. 8 of the drawings. A power shaft 89 is mounted in the main frame of the apparatus and at one end thereof has mounted thereon a sprocket 90. A drive chain 91 passes around the sprocket 90 and a second sprocket 92 on a shaft 93 mounted in suitable bearings in the main frame. A gear 94 is also mounted on the shaft 93 and is caused to rotate through the chain 91 by rotation of the power shaft 89. The gear 94 meshes with a pinion 95 on shaft 96 on which is also mounted the sprocket 46. The sprocket 47 is an idler sprocket and rotates freely on shaft 97. By this mechanism the chain 44 is caused to move through the path heretofore described.

The opposite end of the power shaft 89 has mounted thereon the sprocket 98 on which is mounted the chain 99. This chain also passes around a second sprocket 100 on shaft 101 journaled in the main frame of the apparatus.

Gear 102 is also mounted on shaft 101 and meshes with a pinion 103 on shaft 104. This latter shaft is journaled in bearings 105 and 106 on an inner auxiliary frame within the main frame and at its opposite end has mounted thereon the sprocket 48.

Since the gears 94 and 102 and the pinions 95 and 103 driven thereby are all driven by the same power shaft simultaneously, it will be evident that the two drive sprockets 46 and 48 will rotate at the same speed. Sprocket 49 is an idler and is mounted on the shaft 107 journaled in the bearings 108 and 109 in the same internal frame in which the shaft 104 is mounted. From this it will be evident that both of the drive sprockets 46 and 48 will be driven simultaneously at the same rate of speed, thereby causing the drive chains 44 and 45 to move through the same path carrying with them the rearmost end of the link A.

The same power shaft 89 drives the actuating mechanism for raising and lowering the transport device. Between the bearings 105 and 106, through which shaft 104 passes, there is illustrated a sprocket 110 on the shaft. As shown, a chain 111 passes around sprocket 110 and around another sprocket 112 mounted on shaft 107. The sprocket 86 is also mounted on shaft 107 and is thus driven at the same speed as and in timed relation with the sprockets which actuate the carriage. While sprockets and chains have been shown for purposes of illustration, it will be evident that, if desired, gears could be substituted for example, for the sprockets 110 and 112 and the same result would be achieved.

The other sprocket 88 which drives the chain 85 is also driven by the same power shaft. The gear 102 on shaft 101 meshes with a pinion 113 on a shaft 114 journaled in bearings on the main frame. The inner end of shaft 114 has the sprocket 88 mounted thereon. Since the two pinions 103 and 113 are the same size and driven by the same gear 102, it will be evident that both of the sprockets 86 and 88 will be driven simultaneously in the same direction. Thus, the link B, through its connection with the chains 84 and 85, will be actuated in timed relation with the movement of link A to achieve the desired result of elevating the transport device and lowering it at the proper time.

As shown herein again for purposes of illustration, the transport device consists of a pair of jaws which are caused to open at the proper time and then to close upon a part of the workpiece so that the workpiece will be gripped during its movement between the first and second stations. Other specific mechanism for picking up the workpiece and transporting it may be used instead of the gripper device shown herein. One form of a specific gripper device which could be used is disclosed and claimed in my earlier filed copending application Serial No. 292,962, filed July 5, 1963. The specific form of gripper device illustrated herein is the subject matter of a separate application wherein the device is disclosed in greater detail and claimed. Since it forms no part of the invention claimed herein, it will be described only briefly since reference may be had, if desired, to the last above named application for the details of its operation.

For the present, it is deemed sufficient to point out that an operating link 115 is caused to reciprocate longitudinally to operate the gripper jaws. As shown herein, movement of the link 115 toward the right, as viewed in the various figures, will cause the gripper jaws to close, whereas movement toward the left will cause the jaws to open and release the workpiece which has been gripped therebetween.

The rearmost end of link 115 is pivotally connected as at 116 to one arm 117 of a bell crank lever. This lever is pivotally mounted at 118 to the carriage 22. The other arm 119 of the bell crank lever extends downwardly from the pivot point and has mounted at its outer end a roller 120. Another roller 121 mounted on bracket 122, which is in turn secured to the chain 45, is adapted to contact the roller 120 and move the bell crank lever in a clockwise direction. FIG. 3 shows the roller 121 after it has contacted roller 120 and has thereby caused it to move toward the left, or clockwise direction. During this movement the upper arm 117 will also have been moved in a clockwise direction, thereby to cause the link 115 to move toward the right and clamp the jaws together.

The opposite end of link 115 is secured to a clevis arrangement 123 keyed to a vertically disposed rod 124. The arrangement is such that longitudinal reciprocation of the link 115 will cause the clevis 123 and rod 124 to rotate. The clevis 123 is suitably mounted to the underside of the top plate 24 of the carriage.

The upper end of rod 124 is secured to one end of a link 125 (see particularly FIG. 7). A corresponding link 126 is pivoted at 127 to the upper side of the plate 73 of the transport device. Both of links 125 and 126 extend into a slot in the elongated bar 127a and are secured thereto by suitable pivot pins. Thus, when link 125 is caused to rotate, it will likewise cause link 126 to have the same movement and will move the bar 127a longitudinally as a parallelogram.

One end of the bar 127a has a hole in the upper surface thereof which receives a pin 128 at one end of a link 129. This link is pivotally connected to another link 130 which in turn is secured to a rod 131 extending through a collar 132 on the tubular member 62.

The gripper 11 consists of an upper jaw 133 and a lower jaw 134 pivoted at 135. Suitable connections between the rod 131 and the lower jaw 134 cause the lower jaw to move upwardly and close against the upper jaw into gripping position when the rod 131 is moved toward the right, as viewed in FIG. 7. When the rod 131 is moved in the opposite direction, the lower jaw is moved to open position, as shown in FIG. 6, to release the workpiece.

Thus, when the link 115 has been moved rearwardly or toward the right, by means of the bell crank lever as aforesaid, the vertical keyed rod 124 will rotate in a counterclockwise direction, as viewed in FIG. 7. This will cause the bar 127a to move toward the left by means of the links 125 and 126. This movement of the bar will cause a clockwise movement of the two links 129 and 130 and a movement toward the right of the rod 131 to close the jaws.

As will be apparent from viewing FIG. 3, this closing of the jaws to gripping position will occur when the transport device is in its lowermost position and as the carriage reaches its forwardmost position toward the left. Thereafter, the transport device is lifted to elevate the workpiece to clear the die and then the entire apparatus will begin its movement toward the second station. Just before the apparatus reaches its rearmost position, the jaws are caused to open and release the workpiece by mechanism which may be more clearly understood by reference to FIGS. 7 and 9.

It will here be noted that an elongated bar 136 is mounted along the upper part 31 of the track 29 (see also FIG. 8). The bar 136 along its inner edge extends downwardly as at 137.

An arm 138 is secured to the pivot shaft 118 of the bell crank lever, as shown in FIGS. 7, 8 and 9. This arm 138 extends upwardly from the pivot 118 and has a roller 139 at the outer end thereof. The down-turned portion 137 has a cam surface 140, as shown in FIG. 9. Since the track 29 on which the bar 136 is mounted is stationary and the carriage upon which the bell crank lever and pivot 118 are mounted reciprocates, it will be evident that the bar 136, when in the proper position so that the cam surface 140 thereof is in alignment with the roller 139, and during rearward movement of the carriage, will cause the roller 139 to contact the cam surface 140 and move downwardly thereon to the bottom of the down-turned portion 137, thereby rotating the pivot shaft 118 and the bell crank lever thereon in a counterclockwise direction to the dotted line position shown in FIG. 9. This position of the bell crank is also shown in FIG. 6 where the link 115 will have been moved forwardly toward the left to reverse the previously described operation of the gripper actuating mechanism, thereby to move the jaws to their open position and release the workpiece therefrom.

In FIG. 6 the carriage is shown in its rearmost position and the transport device is shown as it is moving downwardly after having released the workpiece and at the position where the entire apparatus begins its return movement forwardly to the left.

The path of movement of the transport device including the gripper 11 will be like that shown in FIG. 11. Referring now more particularly to FIGS. 10, 11 and 12, these figures are for the purpose of clarifying the movement of the various parts, which movement is obtained by the mechanism heretofore described. The transport device moves in a multidirectional path. The directions and planes of movement involved may vary to suit particular circumstances. Basically, however, the transport device moves in one direction for a part of the path, then in a combination of two directions in another part of the path, and then in a third direction for the remainder of the path.

In FIG. 10 the links A and B are illustrated schematically and the sub numbers indicate the various positions of the link ends throughout the cycle.

It will be noted that at the far lefthand end of FIG. 10 a single point is indicated by the letters $A_1$, $A_2$ and $B_1$. This indicates that in the first position of the links A and B the left or forward ends of both links are at the same respective points in their movements. As the link A moves from the $A_1$ position to the $A_2$ position (corresponding to the position shown in FIG. 4), the forward end of link A will not move because this is the period of dwell of the carriage. The link B, however, has moved from the $B_1$ position to the $B_2$ position thereof. This corresponds to the position of the link B in FIG. 4 which shows that the forward end of link B has also been moved in a horizontal plane to the $B_2$ position. During this movement the rack will have been moved to rotate the pinions and elevate the transport device. If the movement from $B_1$ to $B_2$ is transposed to FIG. 11, it will correspond to the vertical movement of Beginning at this point in the path the link A moves from the $A_2$ position to the $A_3$ position while at the same time the link B moves from the $B_2$ position to the $B_3$ position. During this movement of link A it will be noted that the left or forward end thereof will also have moved in a horizontal direction to the $A_3$ position carrying with it the carriage. While the carriage moves in a horizontal direction for this initial distance, the movement of link B from $B_2$ to $B_3$ position will continue to move the rack a slight amount sufficient to elevate the transport device to its uppermost position. Thus, in the path shown in FIG. 11, the transport device as it is moved from the $A_2$ to the $A_3$ position will have been moved both horizontally and vertically. In this third position of the links the transport device is fully elevated having thus raised the workpiece to a level which will clear the die. From that point on movement of the drive chains will move the links A and B rearwardly in the same path and at the same rate of speed to the point $A_5$ in FIG. 11. In FIG. 10, however, it will be noted that the link A first reaches $A_4$ position and then slows down the movement of the carriage, although it still moves in the same direction during movement of the link from $A_4$ to $A_5$. During this same period of time link B will have moved from $B_4$ to $B_5$ position. It will be noted that the link A in the $A_5$ position thereof is directly in line with the shaft on which the sprocket 50 is mounted. The link B, however, has not quite reached that position with respect to the sprocket 87. Movement from $A_5$ to A will be a dwell of the carriage while movement from $B_5$ to $B_6$ will cause a very slight movement of the rack and transport device. From $B_6$ to $B_7$ the transport device is lowered while the carriage dwells due to the movement of link A to the $A_7$ position thereof.

Movement of link A from $A_7$ to $A_8$ takes place simultaneously with the movement of link B from $B_7$ to $B_8$ during which time the transport device moves through both vertical and horizontal components of the path. From this point forward the carriage and transport device are moved in a horizontal path simultaneously at the same rate of speed back to the $A_1$ and $B_1$ positions to complete the cycle.

Having the foregoing explanation in mind, the schematic showing of FIG. 12 may be more easily understood. This figure shows the movement of the links 69, 71, and 76, 78 which raise and lower the transport device.

The $C_1$ and $D_1$ positions of the two links are the lowermost positions thereof and are comparable to those positions of the links shown in FIG. 3.

As the pinions rotate, the points $C_1$ and $D_1$ will move counterclockwise to the positions $C_2$ and $D_2$ which correspond to the link positions shown in FIG. 4. From $C_2$ and $D_2$ to $C_3$ and $D_3$ which are the positions of the links shown in FIG. 5, the final upward movement of the transport device takes place. Thus, the movement of link B from the $B_1$ to the $B_2$ position elevates the transport device from the $C_1$ to the $C_2$ positions of FIG. 12. From $B_2$ to $B_3$ and from $A_2$ to $A_3$ in FIG. 11 the final vertical distance from $C_2$ to $C_3$ is accomplished. Thus, the entire distance X from $C_1$ to $C_3$ in FIG. 12 comprises the full vertical movement of the transport device and corresponds to the distance X on FIG. 11 and the horizontal movement of the links through the distance X in FIG. 10.

From the foregoing description it will be evident that a novel mechanism has been provided for creating a multidirectional path through which an element may be caused to move for performing a given result. In the present case it is desired that a workpiece may be transferred from one station to another in a situation where the workpiece must either be elevated out of a female die or elevated above a male die or a punch in order to clear the die and enable it to be moved in a direction away therefrom.

Changes may be made in the form and construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. Apparatus for moving a workpiece in a multidirectional path from a first station to a second station comprising
   (a) a carriage reciprocable between said stations,
   (b) first actuating means to reciprocate said carriage including
      (1) a first pair of continuously moving endless chains having upper and lower reaches, and
      (2) a link pivotally connected at one end to said chains and pivotally connected at the other end to said carriage,
   (c) the upper reach of each chain of said first pair of chains passing around a pair of upper sprockets,
   (d) the lower reach of each chain of said first pair of chains passing around a pair of lower sprockets, whereby movement of said one end of said link between the upper and lower reaches of said chains will cause a dwell of said carriage at each of said stations,
   (e) transport means mounted on said carriage and movable with and with respect to said carriage for transporting the workpiece in its path of movement,
   (f) second actuating means to move said transport means with respect to said carriage including
      (1) a second pair of endless chains,
      (2) a rack mounted for longitudinal reciprocation
      (3) at least one pinion mounted on said carriage and meshing with said rack and adapted to be rotated by movement of said rack,
      (4) a link connected at one end to said second pair of chains and at the other end to said rack, whereby movement of said second pair of chains will reciprocate said rack longitudinally, and
      (5) crank means connecting said pinion with said transport means, whereby rotation of said pinion will operate said crank means to move said transport means with respect to said carirage,
   (g) said first and second actuating means being synchronized so that operation of said crank means to move said transport means in one direction with respect to said carriage will occur during at least a portion of the dwell of said carriage at said first station, and operation of said crank means to move said transport means in a second direction with respect to said carriage will occur during at least a portion of the dwell of said carriage at said second station.

2. Apparatus for moving a workpiece in a multidirectional path from a first station to a second station comprising
   (a) a carriage reciprocable between said stations,
   (b) first actuating means to reciprocate said carriage including
      (1) a first pair of continuously moving endless chains having upper and lower reaches, and
      (2) a link pivotally connected at one end to said chains and pivotally connected at the other end to said carriage,
   (c) the upper and lower reaches of said chains being spaced apart a sufficient distance so that during movement of said one end of said link between the upper and lower reaches said other end of said link will remain stationary, thereby causing a dwell in the movement of said carriage at each of said stations,
   (d) transport means mounted on said carriage and movable with and with respect to said carriage for transporting the workpiece in its path of movement,
   (e) second actuating means to move said transport means with respect to said carriage including
      (1) a second pair of endless chains,
      (2) a rack mounted for longitudinal reciprocation
      (3) at least one pinion mounted on said carriage and meshing with said rack and adapted to be rotated by movement of said rack,
      (4) a link connected at one end to said second pair of chains and at the other end to said rack, whereby movement of said second pair of chains will reciprocate said rack longitudinally, and
      (5) crank means connecting said pinion with said transport means, whereby rotation of said pinion will operate said crank means to move said transport means with respect to said carriage,
   (f) said first and second actuating means being synchronized so that operation of said crank means to move said transport means in one direction with respect to said carriage will occur during at least a portion of the dwell of said carriage at said first station, and operation of said crank means to move said transport means in a second direction with respect to said carriage will occur during at least a portion of the dwell of said carriage at said second station.

3. Apparatus for moving a workpiece in a multidirectional path from a first station to a second station comprising
   (a) a carriage reciprocable between said stations,
   (b) first actuating means to reciprocate said carriage including
      (1) a first pair of continuously moving endless chains having upper and lower reaches, and
      (2) a link pivotally connected at one end to said chains and pivotally connected at the other end to said carriage,
   (c) the upper reach of each chain of said first pair of chains passing around a pair of upper sprockets,
   (d) the lower reach of each chain of said first pair of chains passing around a pair of lower sprockets, whereby movement of said one end of said link between the upper and lower reaches of said chains will cause a dwell of said carriage at each of said stations,
   (e) transport means mounted on said carriage and movable with and with respect to said carriage for transporting the workpiece in its path of movement,
   (f) second actuating means to move said transport means with respect to said carriage including
      (1) a second pair of endless chains
      (2) a reciprocating member,
      (3) a link connected at one end to said second pair of chains and at the other end to said member, whereby movement of said second pair of chains will reciprocate said member longitudinally, and (4) intermediate means connected to said transport means and said member and operable, at predetermined times, in response to movement of said second pair of chains, to move said transport means with respect to said carriage, (g) said first and second actuating means being synchronized so that operation of said intermediate means to move said transport means in one direction with respect to said carriage will occur during at least a portion of the dwell of said carriage at said first station, and operation of said intermediate means to move said transport means in a second direction with respect to said carriage will occur during at least a portion of the dwell of said carriage at said second station.

4. Apparatus for moving a workpiece in a multidirectional path from a first station to a second station comprising (a) a carriage reciprocable between said stations,
(b) first actuating means to reciprocate said carriage including
    (1) a first pair of continuously moving endless chains having upper and lower reaches, and
    (2) a link pivotally connected at one end to said chains and pivotally connected at the other end to said carriage,
(c) the upper and lower reaches of said chains being spaced apart a sufficient distance so that during movement of said one end of said link between the upper and lower reaches said other end of said link will remain stationary, thereby causing a dwell in the movement of said carriage at each of said stations,
(d) transport means mounted on said carriage and movable with and with respect to said carriage for transporting the workpiece in its path of movement,
(e) second actuating means to move said transport means with respect to said carriage including
    (1) a second pair of endless chains
    (2) a reciprocating member,
    (3) a link connected at one end to said second pair of chains and at the other end to said member, whereby movement of said second pair of chains will reciprocate said member longitudinally, and
    (4) intermediate means connected to said transport means and said member and operable, at predetermined times, in response to movement of said second pair of chains, to move said transport means with respect to said carriage,
(f) said first and second actuating means being synchronized so that operation of said intermediate means to move said transport means in one direction with respect to said carriage will occur during at least a portion of the dwell of said carriage at said first station, and operation of said intermediate means to move said transport means in a second direction with respect to said carriage will occur during at least a portion of the dwell of said carriage at said second station.

5. The combination of elements defined in claim 1, wherein the length of the chains of said first pair of chains is substantially equal to the length of the chains of said second pair of chains.

6. The combination of elements defined in claim 2, wherein the length of the chains of said first pair of chains is substantially equal to the length of the chains of said second pair of chains.

7. The combination of elements defined in claim 3, wherein the length of the chains of said first pair of chains is substantially equal to the length of the chains of said second pair of chains.

8. Apparatus for moving a workpiece in a multidirectional path from a first station to a second station comprising (a) a carriage reciprocable in a substantially horizontal plane between said stations,
(b) first actuating means to reciprocate said carriage including
    (1) a first pair of continuously moving endless chains having upper and lower reaches, and
    (2) a link pivotally connected at one end to said chains and pivotally connected at the other end to said carriage,
(c) the upper and lower reaches of said chains being spaced apart a sufficient distance so that during movement of said one end of said link between the upper and lower reaches said other end of said link will remain stationary, thereby causing a dwell in the movement of said carriage at each of said stations,
(d) transport means mounted on said carriage for movement therewith and for movement with respect thereto in a substantially vertical direction for transporting the workpiece in its path of movement,
(e) second actuating means to elevate said transport means with respect to said carriage at one of said stations and to lower said transport means with respect to said carriage at the other of said stations including
    (1) a second pair of endless chains,
    (2) a reciprocating member,
    (3) a link connected at one end to said second pair of chains and at the other end to said member, whereby movement of said second pair of chains will reciprocate said member longitudinally, and
    (4) intermediate means connected to said transport means and said member and operable, at predetermined times, in response to movement of said second pair of chains, to elevate and lower said transport means with respect to said carriage,
(f) said first and second actuating means being synchronized so that operation of said intermediate means to elevate said transport means with respect to said carriage will occur during at least a portion of the dwell of said carriage at one of said stations, and operation of said intermediate means to lower said transport means with respect to said carriage will occur during at least a portion of the dwell of said carriage at the other of said stations.

9. Apparatus for moving a workpiece in a multidirectional path from a first station to a second station comprising (a) a carriage reciprocable in a substantially horizontal plane between said stations,
(b) first actuating means to reciprocate said carriage including
    (1) a first pair of continuously moving endless chains having upper and lower reaches, and
    (2) a link connected at one end to said chains and at the other end to said carriage,
(c) the upper reach of each chain of said first pair of chains passing around a pair of upper sprockets,
(d) the lower reach of each chain of said first pair of chains passing around a pair of lower sprockets, whereby movement of said one end of said link between the upper and lower reaches of said chains will cause a dwell of said carriage at each of said stations,
(e) transport means mounted on said carriage and movable therewith in a horizontal path and adapted to be elevated and lowered with respect to said carriage in a substantially vertical path for transporting the workpiece in its path of movement,
(f) second actuating means to elevate and lower said transport means with respect to said carriage including
    (1) a second pair of continuously moving endless chains, (2) a rack mounted for longitudinal reciprocation in a substantially horizontal plane,
(3) a plurality of pinions mounted on said carriage and meshing with said rack and adapted to be rotated by movement of said rack,
(4) a link connected at one end to said second pair of chains and at the other end to said rack, whereby movement of said second pair of chains will reciprocate said rack longitudinally, and
(5) crank means connecting each of said pinions with said transport means, whereby rotation of said pinions will operate said crank means to elevate and lower said transport means with respect to said carriage, (g) said first and second actuating means being synchronized so that operation of said crank means to elevate said transport means will occur during at least a portion of the dwell of said carriage at one of said stations, and operation of said crank means to lower said transport means will occur during at least a portion of the dwell of said carriage at the other of said stations.

References Cited by the Examiner

UNITED STATES PATENTS

| | | |
|---|---|---|
| 2,314,123 | 3/1943 | Butterfield. |
| 2,754,555 | 7/1956 | Young. |
| 2,763,229 | 9/1956 | Sahlin. |
| 2,899,043 | 8/1959 | Young. |
| 3,029,957 | 4/1962 | Freeman. |
| 3,051,327 | 8/1962 | Goodell. |
| 3,090,498 | 5/1963 | Palmer. |

FOREIGN PATENTS

| | | |
|---|---|---|
| 646,723 | 11/1950 | Great Britain. |

GERALD M. FORLENZA, *Primary Examiner.*

MARVIN A. CHAMPION, *Examiner.*